(12) United States Patent
Yen et al.

(10) Patent No.: US 10,860,345 B2
(45) Date of Patent: Dec. 8, 2020

(54) SYSTEM FOR USER SENTIMENT TRACKING

(71) Applicant: Electronic Arts Inc., Redwood City, CA (US)

(72) Inventors: Grace Yen, Vancouver (CA); David Cunningham, Montreal (CA)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 16/367,107

(22) Filed: Mar. 27, 2019

(65) Prior Publication Data

US 2020/0310842 A1    Oct. 1, 2020

(51) Int. Cl.
  *G06F 9/451*    (2018.01)
  *G06F 11/36*   (2006.01)

(52) U.S. Cl.
  CPC ............ *G06F 9/453* (2018.02); *G06F 11/366* (2013.01); *G06F 11/3632* (2013.01); *G06F 11/3664* (2013.01)

(58) Field of Classification Search
  CPC ..... G06F 16/685; G06F 19/00; G06T 7/0002; G06K 9/22; A63F 13/86
  See application file for complete search history.

(56) References Cited

U.S. PATENT DOCUMENTS

| | | | |
|---|---|---|---|
| 8,751,527 B1* | 6/2014 | Riggio | G06F 16/685 707/770 |
| 2012/0301108 A1* | 11/2012 | Zetterower | H04N 5/782 386/241 |
| 2014/0108445 A1* | 4/2014 | Oztekin | G06F 16/90324 707/767 |
| 2014/0108842 A1 | 4/2014 | Frank et al. | |
| 2014/0324749 A1 | 10/2014 | Peters | |
| 2016/0196505 A1 | 7/2016 | Katsuki | |
| 2018/0150739 A1 | 5/2018 | Wu | |
| 2018/0366144 A1 | 12/2018 | Ashoori | |
| 2019/0046886 A1 | 2/2019 | George | |
| 2020/0051582 A1* | 2/2020 | Gilson | H04N 21/4884 |

* cited by examiner

*Primary Examiner* — Cao H Nguyen
(74) *Attorney, Agent, or Firm* — Knobbe, Martens, Olson & Bear, LLP

(57) ABSTRACT

Some embodiments of the present disclosure include a video and audio sentiment analysis system. The video and audio sentiment analysis system can capture video and audio of workflows while a game developer is working on a game development tool. The video and audio sentiment analysis system can use speech-to-text transcription to log requests and suggest help for a game developer. The video and audio sentiment analysis system can capture the recordings for a time period before the error occurs to provide the support team with a recording of the steps that led to the concern. The video and audio sentiment analysis system can package the video stream, transcription of audio, and user interface recordings to the development team such that the support system can replay the scenario of the user to get a full picture of the user's actions and concerns.

20 Claims, 10 Drawing Sheets

SYSTEM FOR USER SENTIMENT TRACKING

BACKGROUND

With increase complexity in modern games and the ability to provide update patches and expansion packs, there are endless possibilities to provide new content, features, and fixes over time. Ongoing development of a game and/or a game development tool makes it possible for customer's voice to play an integral part of further developments. However, gamers and/or game developers may come across an error or some other experience, and may not be able to recreate the scenario for the support team. Moreover, some modern games have over a half a billion player base, and there are an exponentially growing number of game development tools that are necessary to produce modern games, resulting in a surge of help support tickets, usability improvement comments, and general product feedback. To siphon through each support ticket to determine priority and urgency is a lengthy and time-consuming process. Furthermore, customers and/or game developers do not want to fill out a comprehensive questionnaire for each and every issue or comment they would like to submit. Lastly, a questionnaire may not provide all of the details that can efficiently help the support system to understand and address the concern.

SUMMARY OF EMBODIMENTS

The systems, methods, and devices of this disclosure each have several innovative aspects, no single one of which is solely responsible for the all of the desirable attributes disclosed herein.

Some embodiments disclose a system for video and audio analysis for a support ticket, usability improvement comments, and general product feedback, wherein the system includes: one or more processors configured with computer executable instructions that configure the one or more processors to: access user data for a scenario, wherein the user data comprises: a first video recording of a user interface; and an audio stream of a user; identify a first and second baseline characteristic for the user; analyze one or more time frames of the first video and the audio stream to identify a first characteristic for the first video and a second characteristic for the audio stream, respectively; perform sentiment analysis on the user data to identify one or more sentiments based on a comparison of the first baseline characteristic with the first characteristic, and the second baseline characteristic with the second characteristic; bookmark the user data at the one or more time frames corresponding to the identified one or more sentiments, and route the user data with the bookmarks to a support queue based on the identified first or second characteristic.

In some embodiments, the one or more processors are further configured to: identify training material corresponding to the identified first or second characteristic; and cause display of the training material with a user interface element for submitting a support ticket, usability improvement comments, and general product feedback.

In some embodiments, the one or more processors are further configured to: continuously record the first video of the user interface over a time period in a ring buffer; and in response to receiving an indication of the user selection of a help button, store the first video of the user interface.

In some embodiments, the one or more processors are further configured to: sync the first video with the audio stream based on a computer time stamp.

In some embodiments, the user data further comprises at least one of: user telemetry data, an event time line, user input from a keyboard, or user input from a mouse, game controller, tablet, stylus pens, user input from a virtual and/or augmented reality device, and/or the like. For example, a user can use a virtual reality device, navigate in a virtual environment, and provide input, such as a voice stream indicating that the color palette is hard to see in a certain location.

In some embodiments, the user data further comprises a second video of the user via a camera or camcorder.

In some embodiments, to perform sentiment analysis includes performing facial recognition on the second video of the user.

In some embodiments, the second characteristic includes at least one of: a voice tone or voice volume.

In some embodiments, the one or more processors are further configured to transcribe the audio stream into text, and wherein the second characteristic includes a word choice.

Some embodiments disclose a method for video and audio analysis for a support ticket, usability improvement comments, and general product feedback, wherein the method includes: accessing user data for a scenario, wherein the user data comprises: a video recording of a user interface; and an audio stream of a user; identifying a first and second baseline characteristic for the user; analyzing one or more time frames of the video and the audio stream to identify a first characteristic for the video and a second characteristic for the audio stream, respectively; performing sentiment analysis on the user data to identify one or more sentiments based on a comparison of the first baseline characteristic with the first characteristic, and the second baseline characteristic with the second characteristic; bookmarking the user data at the one or more time frames corresponding to the identified one or more sentiments, and routing the user data with the bookmarks to a support queue based on the identified first or second characteristic.

In some embodiments, the method further includes: linking the user data with user data of other users based on matching first and/or second characteristics.

In some embodiments, the method further includes: identifying a general user experience for a software tool corresponding to the user data of the user and the user data of the other users.

In some embodiments, identifying the general user experience is based on the sentiment analysis performed on the user data and a sentiment analysis performed on the user data of the other users.

In some embodiments, the method further includes: identifying a software tool that the user is using during the video recording, wherein the first or second baseline characteristic is a predicted user response for the identified software tool.

In some embodiments, the method further includes: determine an indication of urgency based on the sentiment analysis.

In some embodiments, the method further includes: transmitting the user data and the bookmarks to a support system, wherein the support system is configured to replay the user data and display indications of the book marks on the user data. The bookmarks can indicate a position in the video and/or audio files that the support system can highlight to a support team member, indicating the portion of the video and/or audio files where the user is frustrated.

Some embodiments disclose a non-transitory computer storage medium storing computer-executable instructions that, when executed by one or more processor, cause the one or more processors to perform the following method: accessing user data for a scenario, wherein the user data comprises: a video recording of a user interface; and an audio stream of a user; identifying a first and second baseline characteristic for the user; analyzing one or more time frames of the video and the audio stream to identify a first characteristic for the video and a second characteristic for the audio stream, respectively; performing sentiment analysis on the user data to identify one or more sentiments based on a comparison of the first baseline characteristic with the first characteristic, and the second baseline characteristic with the second characteristic; bookmarking the user data at the one or more time frames corresponding to the identified one or more sentiments, and routing the user data with the bookmarks to a support queue based on the identified first or second characteristic.

In some embodiments, the method further comprises: identifying training material corresponding to the identified first or second characteristic; and causing display of the training material with a user interface element for submitting a support ticket, usability improvement comments, and general product feedback.

In some embodiments, the method further comprises: continuously recording the video of the user interface over a time period in a ring buffer; and in response to receiving an indication of the user selection of a help button, storing the video of the user interface.

In some embodiments, the method further comprises: syncing the video with the audio stream based on a computer time stamp.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION

Overview

Figure 1:
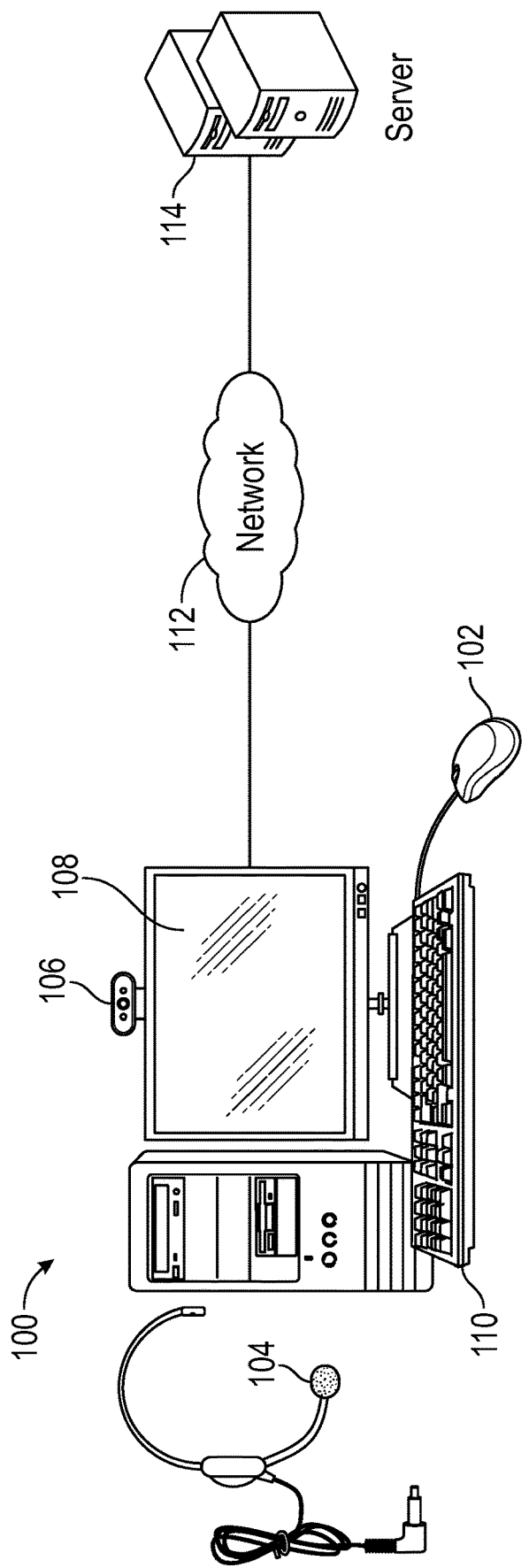
FIG. 1 illustrates an embodiment of a block diagram of a video and audio sentiment analysis system.

There is a need to effectively and efficiency streamline the procedure of submitting a help ticket, usability improvement comments, and general product feedback. Existing game development systems are limited by the user's input into a questionnaire. For example, existing game development systems can create a help desk ticket by asking a user to fill out an online form, submitting a help desk ticket, and place the help desk ticket in a support representative's queue requesting the representative to help the user. The online form can include an option for a user to upload a file, such as a screenshot.

Some embodiments of the present disclosure include a video and audio sentiment analysis system that mitigates and/or eliminates the drawbacks of existing game and game developer systems. The video and audio sentiment analysis system can capture video and audio of workflows while a game developer is working on a game development tool. The video and audio sentiment analysis system can use speech-to-text transcription to log requests and suggest help for a game developer. The video and audio sentiment analysis system can capture the recordings for a time period before the error occurs to provide the support team with a recording of the steps that led to the concern. Advantageously, the game developer is not required to retrace his or her steps and/or recreate an error that may not always reoccur. The video and audio sentiment analysis system can package the video stream, transcription of audio, and user interface recordings to the support system such that the support system can replay the scenario (e.g., replay an audio stream of the user, a video of a user's interface, user telemetry data, and/or the like) of the user to get a full picture of the user's actions and concerns.

In some embodiments, the video and audio sentiment analysis system can continuously record a user's interface, such as a game developer's interface in a ring buffer, so that when the user requests submission of a help desk ticket, the video and audio sentiment analysis system can retrieve a recording of the user interface for a time period, such as 5 or 15 minutes, before the user selects the help button. Advantageously, the video and audio sentiment analysis system can retrieve a recording of the user interface showing the user's movement and actions taken in the game development tool that led to the reason for the help desk ticket. Moreover, the video and audio sentiment analysis system can continue to record and capture a recording of the user's desktop after the user selects the help button. The recording of the user's desktop can capture actions taken by the user, such as user selection or actions performed within the development tool. The video and audio sentiment analysis system can capture a recording of each function executed, selected, or attempted to activate within the program. For example, the recording can capture mouse movement, mouse selections, and/or keyboard inputs. The video and audio sentiment analysis system can receive an indication that the user wants to submit an error, a concern, feedback, or other commentary on the game and/or a game development tool. For example, the user can click on an icon within the game development tool to start recording.

In some embodiments, the video and audio sentiment analysis system can capture an audio stream of the user, such as from a microphone. The user can speak into the microphone to describe their problem and/or workflow annoyance. Advantageously, the user submitting the help desk ticket may quickly describe the issues immediately after selecting the help button. The video and audio sentiment analysis system can continuously record the audio stream, such as in a ring buffer, to retrieve audio data prior to the user selecting the help button. Advantageously, the video and audio sentiment analysis system can identify a user's urgency based on voice characteristics, such as if the user's voice tone changes from the user's typical tone or if the user uses certain words that indicate a sense of urgency.

In some embodiments, the video and audio sentiment analysis system can transcribe the audio stream. The video and audio sentiment analysis system can analyze the transcribed text to identify statements made by the user. The video and audio sentiment analysis system can automatically generate a support ticket based on the text, such as automatically populating certain fields such as tool version, operating system, the team that the game developer is on, and/or the like based on the analysis of the transcription.

In some embodiments, the video and audio sentiment analysis system can capture a video stream of the user, such as via a web cam. The video and audio sentiment analysis system can continuously record a video stream of the user, such as via a ring buffer. The video and audio sentiment analysis system can capture a video stream of the user after the user selects the help button, continuously in a ring buffer, and/or the like.

In some embodiments, the video and audio sentiment analysis system can identify characteristics of the user data. The video and audio sentiment analysis system can identify these characteristics automatically based on an analysis of the transcribed text, such as determining a level of urgency based on a user's choice of words, such as when the user uses profanity or certain keywords or phrases such as "error" or "big problem." The video and audio sentiment analysis system can identify characteristics based on the audio stream, such as identifying that the user's tone of voice is much louder than the user's typical voice. The video and audio sentiment analysis system can analyze the video to determine a characteristic of the user data, such as a higher level of urgency if the user is moving around or waving his or her arms in disapproval, or determine that the error is fixed by identifying a "thumbs up." In some embodiments, the video and audio sentiment analysis system can determine a priority for the help ticket based on the identified characteristics and/or the level of urgency. For example, the video and audio sentiment analysis system can connect the user with a live representative support team member in response to a high level of urgency.

In some embodiments, the video and audio sentiment analysis system can analyze the video stream to identify characteristics of the user data. For example, the video and audio sentiment analysis system can track eye movements to identify the user's focus. The video and audio sentiment analysis system can categorize a user's facial features into sentiment and emotion categories, such as frustrated, excited, neutral, happy, and/or the like based on the facial recognition of the user's face.

In some embodiments, the video and audio sentiment analysis system can sync a recording of the user interface, audio stream, and/or the video stream of the user. For example, the video and audio sentiment analysis system can retrieve time stamps from each of the streams of data, and sync the data files based on the time stamps. Advantageously, the user can describe the issues via the microphone while pointing to selected options in certain feature tools, providing the support system with a fuller view of the environment that the user is concerned with.

In some embodiments, the video and audio sentiment analysis system can automatically determine the appropriate support system for the corresponding identified characteristics. For example, the video and audio sentiment analysis system can send high urgency problems to a team available to address the problem immediately. The video and audio sentiment analysis system can categorize the data files of video and audio data based on similar characteristics and send the data files to the corresponding support teams. For example, the video and audio sentiment analysis system can identify that the user is working on a first feature of a development tool, can group data files corresponding to other help desk tickets together for the first feature, and send the grouped data files to the corresponding support teams that handle errors for the first feature, comments, and/or updates. The support system can enable a support member to replay the user interface recording, the audio recording, and/or the video recording of the user, and/or see a live stream of the user interface, user voice, user video to address the concern. The support system can enable a support member to replay multiple recordings in the data files of users that may be going through similar issues in the tool for the first feature.

In some embodiments, the video and audio sentiment analysis system can provide relevant training material, documentation, tutorials, help information and/or the like for a particular characteristic. The video and audio sentiment analysis system can identify characteristics of the user data that the user is in, even before the user selects a request for help, and can preemptively determine that the user is in need of help. For example, the video and audio sentiment analysis system can determine that the user has tried a certain option several times over a short time period, is starting to yell at the screen, or is looking at the wrong portion of the screen based on facial recognition. The video and audio sentiment analysis system can proactively identify relevant training material and display the material on the user interface.

In some embodiments, the video and audio sentiment analysis system can determine that the user is in need of help based on the identified characteristics of the user data. The video and audio sentiment analysis system can enable a "prioritized help live" option that enables the user to receive live help. For example, the user can be frustrated as a result of several crashes within a tool. The video and audio sentiment analysis system can identify that the user selected the same tool features several times via the user interface stream, and identifies that the user is frustrated based on a raise voice and arms in the air. The video and audio sentiment analysis system can display a flashing button that states "request live help now," that, in response to a user selection of the button, a help ticket is generated with higher priority and/or is connected with a live support system.

In some embodiments, the video and audio sentiment analysis system can identify portions of the user data, such as the user interface video, the audio recording, or the video recording of the user, and highlight relevant portions for the support team. Advantageously, the support team can identify certain aspects of the user data may be more important than others.

Video and Audio Sentiment Analysis System Block Diagram

Figure 2:
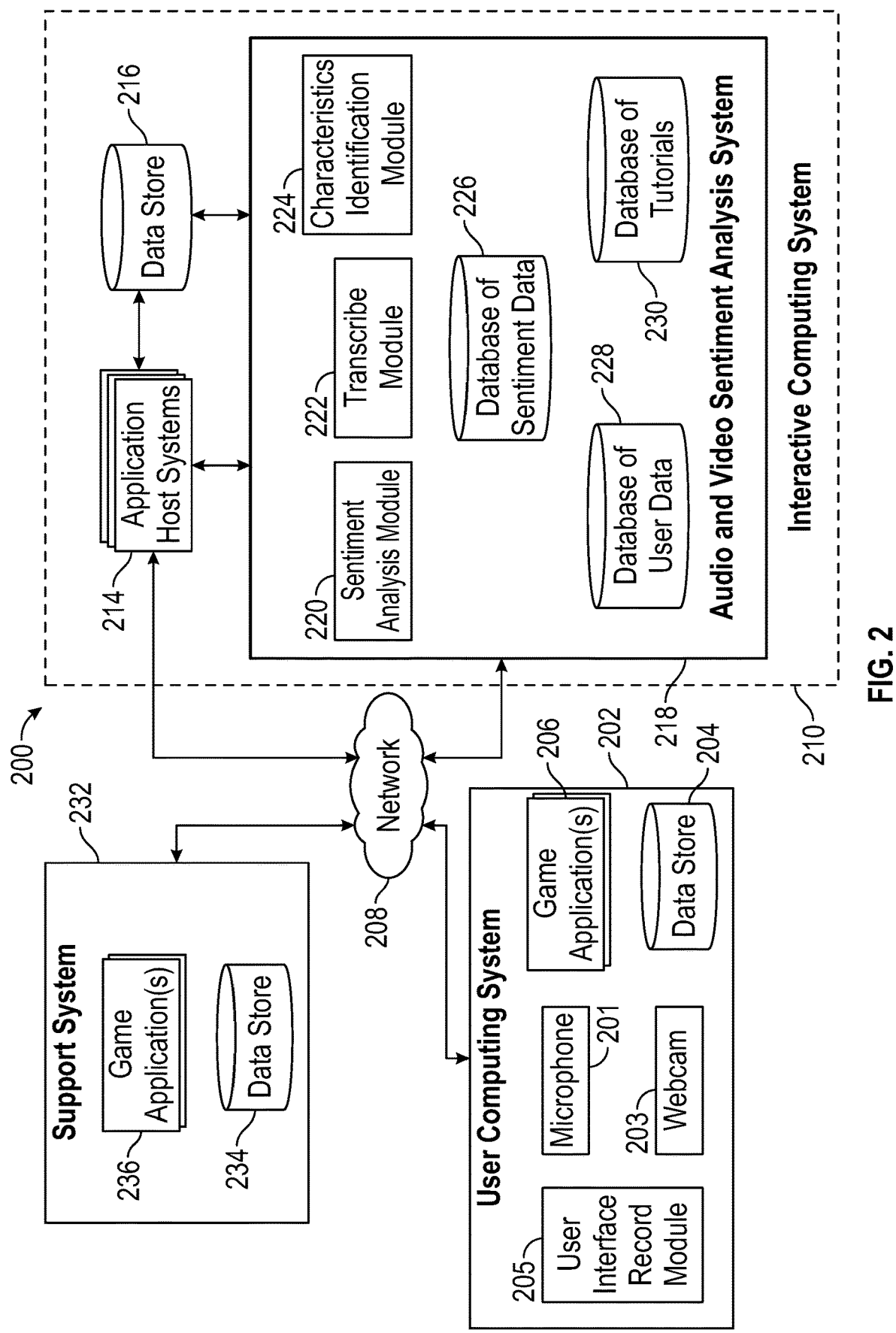
FIG. 2 illustrates an embodiment of a computing environment for implementing one or more embodiments of the present disclosure.

FIG. 2A illustrates an embodiment of a block diagram 100 of a video and audio sentiment analysis system. The video and audio sentiment analysis system can include and/or receive data from, but are not limited to, a mouse 102, a keyboard 110, a webcam 106, a user interface 108, a microphone 104, a network 112, and/or a server 114. In some embodiments, the video and audio sentiment analysis system can include more or less components. For example, the video and audio sentiment analysis system can receive an image from an external source, such as from a webcam 106 of an external game developer system.

In some embodiments, a webcam 106 can capture an image and/or video of a user. For example, a game developer can use a game development tool and/or a user can be playing a game in front of a monitor. The webcam 106 can capture an image and/or video of the user using the game development tool and/or the user playing the video game. The webcam 106 data can be used by the video and audio sentiment analysis system to determine characteristics of the user data, such as a whether the user's face is showing a smile or a frown. The video and audio sentiment analysis system can perform facial recognition on the video data. The video and audio sentiment analysis system can assess facial features that indicate a sentiment, such as an emotion, of the user. Furthermore, the video and audio sentiment analysis system can capture where the user is looking on the graphical user interface 108, such as based on the positioning of the eyes.

In some embodiments, a microphone 104 can record an audio stream of a user. A user can talk through the steps the user is taking on the game development tool and/or in-game. The microphone 104 can record a user such that a user does not have to fill out a questionnaire or describe the concern separately. The video and audio sentiment analysis system can transcribe the audio stream. The video and audio sentiment analysis system can perform sentiment analysis on the text transcription to identify characteristics of the user data, such as whether the concern seems urgent based on the words the user uses (e.g., profanity). Moreover, the video and audio sentiment analysis system can assess characteristics of the user's voice, such as pitch or tone, to identify characteristics of the user data. For example, the video and audio sentiment analysis system can determine if the user is yelling based on a comparison of a typical volume of the user's voice and the current volume of the voice in the audio stream. A support team member can search the transcribed text for certain key words, such as a name of a tool feature to identify the relevant portions of the user interface stream and video stream for that tool feature.

In some embodiments, a user computing system can send a recording of a user's interface 108 to the video and audio sentiment analysis system. The recording can indicate the selections of the user on the user interface 108. The video and audio sentiment analysis system can determine the features that a user is selecting, such as a particular game development tool or an icon on a menu. The video and audio sentiment analysis system can determine whether the user is performing certain steps corresponding to a tool feature, such as whether the user is first selecting the correct button and then thereafter selecting the correct second button. The video and audio sentiment analysis system can identify background information of a user system, such as the operating system, a tool version, and/or the like.

In some embodiments, the user interface can include a code, such as a pixel code, that can be read by the video and audio sentiment analysis system in order to access information related to the user data. For example in one embodiment, the user interface can include a 1×1 pixel that is loaded onto a development tool. The recording can identify the pixel code on the development tool to identify information regarding the development tool, such as a development tool type, a particular feature within the development tool, a version code for the development tool, and/or the like.

In some embodiments, the video and audio sentiment analysis system can record user input, such as via a keyboard 110 and a mouse 102. The video and audio sentiment analysis system can record the keys pressed on the keyboard 110, such as via a keylogger. The video and audio sentiment analysis system can identify sentiments of the user via the input, such as if the user is moving the mouse a lot faster than usual indicating a sense of frustration.

In some embodiments, the video and audio sentiment analysis system can continuously record user data. For example, the video and audio sentiment analysis system can continuously record a video of the user via the webcam 106, audio via the microphone 104, user input via the mouse 102 and keyboard 110, and a video of the user interface 108 using a ring buffer that saves the last 15 minutes of a user. When the user indicates that he or she would like to submit a concern, the video and audio sentiment analysis system can save the last 15 minutes of the user data. In some embodiments, the video and audio sentiment analysis system can automatically identify that the user is in need of help and can automatically save the last 15 minutes of the user data.

Video and Audio Sentiment Analysis System Block Diagram

FIG. 2B illustrates an embodiment of a computing environment for implementing one or more embodiments of the present disclosure. The environment 200 can include a network 208, one or more user computing systems 202, one or more support systems 232, and/or an interactive computing system 210. To simplify discussion and not to limit the present disclosure, FIG. 2B illustrates only one component, such as one user computing system 202, one support system 232, and one interactive computing system 210, though multiple systems may be used.

In some embodiments, the interactive computing system 210 can include application host systems 214, one or more data stores 216, and an audio and video sentiment analysis system 218. The audio and video sentiment analysis system 218 can communicate with data store 216 and/or with the application host systems 214 to acquire data associated with a game application and to provide custom character data for use in a game application. The audio and video sentiment analysis system 218 can additionally or alternatively communicate with user computing system 202, one or more support systems 232, and/or one or more third party media sources through the network 208. Although only one network 208 is illustrated, multiple distinct and/or distributed networks may exist. The various systems and other components illustrated in FIG. 2B, including interactions or communications between them, will now be described in more detail below.

A. Interactive Computing System

In the illustrated embodiment, the interactive computing system 210 includes application host systems 214, a data store 216, and an audio and video sentiment analysis system 218. These systems may communicate with each other. For example, the audio and video sentiment analysis system 218 can obtain data associated with a game application from the application host systems 214 and can provide object and/or feature data to the application host systems 214 and/or for storage in the data store 216. The application host systems 214 can communicate with the data store 216 to execute and/or host a game application. In certain embodiments, the interactive computing system 210 may be associated with a network-based service, which may be operated by a game publisher, game developer, platform provider or other entity.

1. Application Host Systems

In some embodiments, the application host systems 214 can be configured to execute a portion of the game application 206 operating on the user computing system 202 and/or a host application (not illustrated) on the interactive computing system 210. Further details are described regarding the application host systems 214 below. In certain embodiments, the application host systems 214 may execute another application instead of or in addition to executing a portion of the game application 206 and/or a host application, which may complement and/or interact with the game application 206 during execution of a gameplay session of the game application 206.

In some embodiments, the interactive computing system 210 may enable multiple players or computing systems to access a portion of the game application 206 and/or a host application. In some embodiments, the portion of the game application 206 executed by application host systems 214 of the interactive computing system 210 may create a persistent virtual world. This persistent virtual world or virtual environment may enable one or more players to interact with the virtual world and with each other in a synchronous and/or asynchronous manner. In some cases, multiple instances of the persistent virtual world may be created or hosted by the interactive computing system 210. A set of users may be assigned to or may access one instance of the persistent virtual world while another set of users may be assigned to or may access another instance of the persistent virtual world.

In some embodiments, the application host systems 214 may execute a hosting system for executing various aspects of a game environment. For example, in one embodiment, the game application 206 may be a competitive game, such as a first person shooter or sports game, and the application host system 214 can provide a dedicated hosting service for hosting multiplayer game instances or facilitate the creation of game instances hosted by user computing devices. In some embodiments, the application host systems 214 can provide a lobby or other environment for users to virtually interact with one another. In some embodiments, the virtual environments may be populated with one or more virtual characters, objects, and/or features generated by the audio and video sentiment analysis system 218, as well as one or more characters, objects, and/or features designed by a game developer.

2. Audio and Video Sentiment Analysis System

As will be described in further detail herein, the audio and video sentiment analysis system 218 can communicate with other systems to acquire media and other data, capture audio/video data and analyze the data to determine sentiments of a user. The audio and video sentiment analysis system 218 can include one or more systems, subsystems or components for implementing various functionality described herein. For example, the audio and video sentiment analysis system 218 can include a sentiment analysis module 220, a transcribe module 222, an characteristics identification module 224, a database of sentiment data 226, a database of user data 228, and/or a database of tutorials 230. These example systems or components are not intended to be limiting, and the audio and video sentiment analysis system 218 may include fewer or more systems or components than illustrated or described.

In some embodiments, the audio and video sentiment analysis system 218 and its various systems or components may be distributed across multiple computing systems. The various systems of the audio and video sentiment analysis system 218 can communicate with each other to obtain data, analyze data, and generate sentiment data. While various systems are illustrated as part of the interactive computing system 210 and/or audio and video sentiment analysis system 218, it will be appreciated that each system's functionality could be implemented by a different or multiple computing systems or devices. Furthermore, a single system could implement functionality described herein as being provided or implemented by multiple systems in communication with each other. Similarly, functionality described as being provided by the audio and video sentiment analysis system 218 of the interactive computing system 210 could instead be implemented at a user computing system 202 and/or a support system 232, in other embodiments. Each system or component of the audio and video sentiment analysis system 218 is described generally below, with associated functionality further described subsequently with respect to other figures.

a. Sentiment Analysis Module

In some embodiments, the sentiment analysis module 220 may be configured to identify a sentiment of a user, depending on the embodiment. For example, as will be described further herein, the sentiment analysis module 220 may receive user data, such as a video stream of the user, an audio stream of a user's voice, a video of a user's interface, and/or the like from the user computing system 202, and/or other source. User data can include an event timeline that may have a lot more metadata than can be extracted via recordings. Moreover, the user computing device can collect user telemetry data that can be assessed for sentiments and characteristics.

In some embodiments, sentiment analysis module 220 may be configured to communicate via various APIs or other protocols specific to a particular service or system that stores particular media data. In some embodiments, the obtained media may include videos, audio, and/or images depicting the user, as captured by a camera (such as a mobile phone's camera, a webcam, a standalone digital camera, a security camera, and/or other device).

In some embodiments, the sentiment analysis module 220 can indicate that the user corresponds to an emotion, such as frustrated, happy, nervous, excited, and/or the like. The sentiment analysis module 220 can assess words transcribed from the audio stream by the transcribe module 222, such as a user's choice of words that may indicate seriousness of the concern. The sentiment analysis module 220 can perform analysis on a user's voice and/or facial recognition to identify a sentiment, such as a rise in a user's voice or an unhappy face. The sentiment analysis module 220 can retrieve the user data from the database of user data 228. The sentiment analysis module 220 can receive an indication from the characteristic identification module and determine a sentiment according to the characteristics identified. For example, the characteristics identification module 224 may identify the change in voice tone, and the sentiment analysis module 220 can identify that the user is yelling and unhappy.

In some embodiments, the sentiment analysis module 220 can include one or more machine learning models, such as deep neural networks. The sentiment analysis module 220 can be trained to identify sentiment based on user data and/or characteristics identified by the characteristics identification module 224. For example, the sentiment analysis module 220 can input a video stream of the user into its neural network and the neural network can output an indication of whether the user appears frustrated or unhappy. The sentiment analysis module 220 can input characteristics of the user data, such as a smile on the user's face, an increased user's voice, and/or a particular series of selections on the user interface into a neural network, and the neural network can indicate that the user appears happy. The neural network of the sentiment analysis module 220 can output a probability of a sentiment (e.g., 80% likelihood that the user is happy) and/or a selection of a sentiment (e.g., happy). In other embodiments, the sentiment analysis module 220 can include hard coded logic.

b. Transcribe Module

In some embodiments, the transcribe module 222 can be configured to transcribe an audio stream of a user's voice. As will be described below, the transcribe module 222 may receive an audio stream from a user computing system 202, such as via a microphone 251. The transcribe module 222 can send the transcribed data to the characteristics identification module 224 and/or the sentiment analysis module 220 for further analysis, such as identifying a user's selection of words and/or a user's sentiment.

c. Characteristics Identification Module

In some embodiments, the characteristics identification module 224 may be configured to identify a characteristic of the user data. For example, the characteristics identification module 224 can receive object and/or feature data from the database of user data 228, and determine the arrangement based on the input from the characteristics identification module 224 and/or the sentiment analysis module 220. The characteristics identification module 224 can identify a characteristic of the user, such as the identification of a user sentiment.

In some embodiments, the characteristics identification module 224 can include one or more machine learning models, such as deep neural networks. The characteristics identification module 224 can be trained to identify a characteristic in user data. For example, the characteristics identification module 224 can input a video stream of the user into its neural network and the neural network can output a voice tone of the user, a change in the voice tone of the user, a characteristic of a user's face (such as eyebrows raised), a characteristic of a user's body (such as hands raised) and/or the like. The characteristics identification module 224 can send the identified characteristics to the sentiment analysis module 220 in order to identify a sentiment. In other embodiments, the characteristics identification module 224 can include hard coded logic.

d. Database of Sentiment Data

In some embodiments, the database of sentiment data 226 can be configured to store data corresponding to sentiments identified by the sentiment analysis module 220. The database of sentiment data 226 may be distributed across multiple computing devices (see for example computing device 10 in FIG. 9). In some embodiments, the database of sentiment data 226 may be network-based storage system where data may be stored in different locations.

e. Database of User Data

In some embodiments, the database of user data 228 can be configured to store data such as data from a user computing system 202. For example, the database of user data 228 can store a video stream of the user from a webcam 253, a user's voice from a microphone 251, and/or a video of the user's interface from the user interface record module 255 of a user computing system 202. The database of user data 228 may be distributed across multiple computing devices (see for example computing device 10 in FIG. 9). In some embodiments, the database of user data 228 may be network-based storage system where data may be stored in different locations.

f. Database of Tutorials

In some embodiments, the database of tutorials 230 can be configured to store data such as tutorial data, training data, and/or relevant data corresponding to characteristics identified in the user data by the characteristics identification module 224 and/or sentiments identified by the sentiment analysis module 220. For example, the characteristics identification module 224 can identify that the user is working on a particular tool in a video game development product suite, and the sentiment analysis module 220 can identify that the user is frustrated with the tool. The audio and video sentiment analysis system 218 can retrieve a training video corresponding to the tool and display the training video to the user. The database of tutorials 230 may be distributed across multiple computing devices (see for example computing device 10 in FIG. 9). In some embodiments, the database of tutorials 230 may be network-based storage system where data may be stored in different locations.

3. Data Store of Interactive Computing System

In some embodiments, the interactive computing system 210 can include a data store 216. The data store 216 can be configured to store data acquired by other systems, such as, for example, telemetry data, video data, game state information, user data, or the like. In some embodiments, the data store 216 may store user account data associated with a video game publisher, a game platform provider or other service that enables a user to maintain preferences, virtual characters, avatars, achievements, and/or other data across a plurality of different video games. The data store 216 may be distributed across multiple computing devices (see for example computing device 10 in FIG. 9). In some embodiments, the data store 216 may be network-based storage system where data may be stored in different locations.

B. User Computing System

In some embodiments, the user computing system 202 can be controlled by a user, such as a developer of a game development system. The user computing system 202 may include hardware and software components for establishing communications over a communication network 208. For example, the user computing system 202 may be equipped with networking equipment and network software applications (for example, a web browser) that facilitates communications via one or more networks (for example, the Internet or an intranet). The user computing system 202 may have varied local computing resources such as central processing units and architectures, memory, mass storage, graphics processing units, communication network availability and bandwidth, and so forth. Further, the user computing system 202 may include any type of computing system. For example, the user computing system 202 may include any type of computing device(s), such as desktops, laptops, game application platforms, virtual reality systems, augmented reality systems, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few. In some embodiments, the user computing system 202 may include one or more of the components or embodiments described below.

In some embodiments, the user computing system 202 may include a webcam 253 to record a video of the user, a camcorder, a camera, a camera on a mobile phone, and/or the like. The user computing system 202 may include a microphone 251 to record a voice of the user, a headset with an audio input, a webcam with an audio input, and/or the like. The user computing system 202 can include a user interface record module 255 to record a stream of the user interface for the game developer, record user input (such as on a mouse and/or keyboard), and/or the like.

1. Game Application(s) and Host Application System

In some embodiments, the user computing system 202 is capable of executing one or more game applications 206, which may be stored and/or executed locally and/or in a distributed environment. In a locally executed game application 206, generally, the game does not rely or utilize an external computing system (for example, the interactive computing system 210) to execute the game application. In some instances, a locally executable game can communicate with an external server to retrieve information associated with the game, such as game patches, game authentication, clouds saves, custom virtual character data, user account data, or other features. In distributed game applications, the user computing system 202 may execute a portion of a game and the interactive computing system 210, or an application host system 222 of the interactive computing system 210 may execute another portion of the game. For instance, the game may be a massively multiplayer online role-playing game (MMORPG) that includes a client portion executed by the user computing system 202 and a server portion executed by one or more application host systems 214. For the present discussion, the type of game application 206 can be a locally executable game, a distributed application, or an application that includes a portion that executes on the user computing system 202 and a portion that executes on at least one of the application host systems 214.

2. Data Store

In some embodiments, the user computing system 202 can include a data store 204. The data store 204 can be configured to store data associated with one or more game applications 206, local account data associated with an account maintained for the user by the interactive computing system 210, virtual characters created by the user that are usable in one or more games, and/or other game-related or account-related data. In some embodiments, the user may utilize storage of the user computing system 202, such as data store 204, to store various personal photos, videos, files, and other information that a user may generally choose to store on a personal desktop or laptop computer, for instance. 204 The data store 204 may be distributed across multiple computing devices (see for example computing device 10 in FIG. 9).

C. Support System

In some embodiments, the support system 232 can be controlled by a user, such as a support team member for a video game. The support system 232 may include hardware and software components for establishing communications over a communication network 208. For example, the support system 232 may be equipped with networking equipment and network software applications (for example, a web browser) that facilitates communications via one or more networks (for example, the Internet or an intranet). The support system 232 may have varied local computing resources such as central processing units and architectures, memory, mass storage, graphics processing units, communication network availability and bandwidth, and so forth. Further, the support system 232 may include any type of computing system. For example, the support system 232 may include any type of computing device(s), such as desktops, laptops, game application platforms, virtual reality systems, augmented reality systems, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few. In some embodiments, the support system 232 may include one or more of the components or embodiments described below.

In some embodiments, the support system 232 is capable of executing one or more game applications 206, which may be stored and/or executed locally and/or in a distributed environment. The support system 232 can execute the game application that replays the portion of the game development tool and/or the video game that the user of the user computing system 202 had concerns with.

In some embodiments, the support system 232 can include a data store 204. The data store 204 can be configured to store data associated with one or more game applications 206, local account data associated with an account maintained for the user by the interactive computing system 210, virtual characters created by the user that are usable in one or more games, and/or other game-related or account-related data.

D. Other Considerations

Although the various systems are described separately above, it should be noted that one or more of these systems may be combined together. For example, the interactive computing system 210 may provide functionality similar to one or more user computing systems 202. Additionally, one or more of the systems may be executed by the same computing device (see for example, computing device 10 in FIG. 9) or by a different computing system than illustrated in FIG. 2B. For example, the audio and video sentiment analysis system 218 may be executed on the same computing device as the user computing system 202. On the other hand, one or more systems may be executed by multiple computing devices. For example, a portion or subsystem of the audio and video sentiment analysis system 218 may be implemented by a user's personal computer or the user computing system 202 while another portion or subsystem may be implemented by a server.

Identifying Characteristics in User Data Flow Diagram

Figure 3:
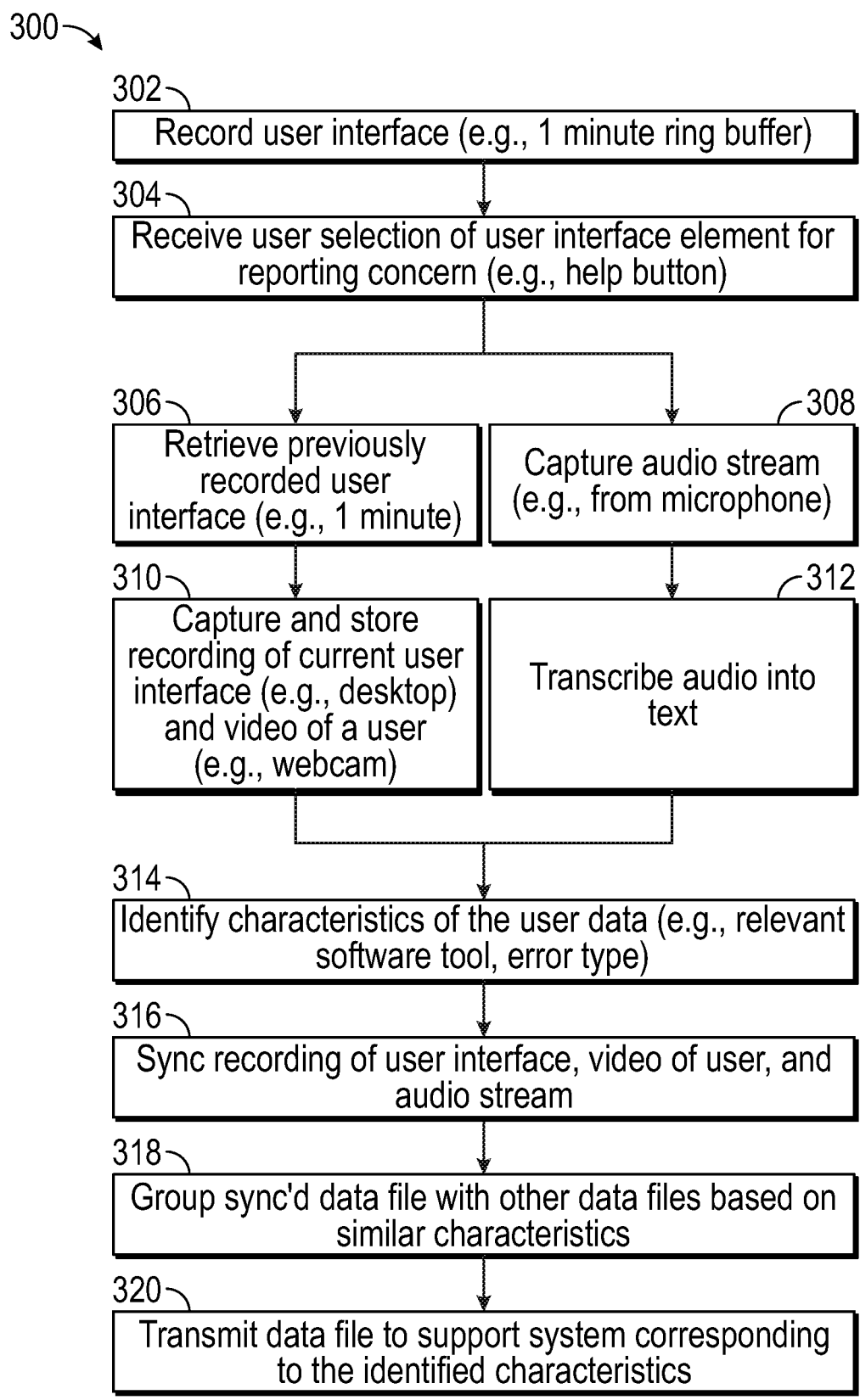
FIG. 3 provides a flow diagram for identifying characteristics in user data.

FIG. 3 provides a flow diagram 300 for identifying characteristics in user data. The process 300 can be implemented by any system that can identify characteristics in user data. For example, the process 300, in whole or in part, can be implemented by the characteristics identification module 224, or other computing system. Although any number of systems, in whole or in part, can implement the process 300, to simply discussion, the process 300 will be described with respect to particular systems. Further, although embodiments of the process 300 may be performed with respect to variations of systems comprising various game development environments and/or game engines, to simply discussion, the process 300, will be described with respect to the audio and video sentiment analysis system 100.

At block 302, the audio and video sentiment analysis system can record a user interface. For example, the audio and video sentiment analysis system can record a user interface in a ring buffer that continually records over a last time period, such as for the last minute. The audio and video sentiment analysis system can overwrite the current user interface video with video that exceeds the time period. The audio and video sentiment analysis system can record an audio stream, user input, telemetry data, a video of the user, and/or the like as user data in the ring buffer.

At block 304, the audio and video sentiment analysis system can receive a user selection of a user interface element for reporting a concern. For example, the user can select a help button. The user interface element can include an option to begin a live chat with a support member via the support system. In some embodiments, the audio and video sentiment analysis system can automatically identify that the user is in need of help without the need to receive a selection of a user interface element.

At block 306, the audio and video sentiment analysis system can retrieve the previously recorded user interface and store the recording. The audio and video sentiment analysis system can retrieve other user data that has been recording, such as a video of the user, audio stream of the user, and/or the like. The audio and video sentiment analysis system can retrieve the previously recorded stream from a ring buffer. Advantageously, the audio and video sentiment analysis system can capture the steps that were taken before the error and/or cause of concern occurred. The audio and video sentiment analysis system can provide a more complete picture for the support system to assess the concern.

At block 310, the audio and video sentiment analysis system can capture and store a recording of the current user interface and a video of the user. The audio and video sentiment analysis system can capture a stream of the user on the user interface navigating through the game and/or game development tool. For example, after the user selects the help button, the user can try to recreate the cause of the concern by selecting the options and/or features of the game or game development tool. The audio and video sentiment analysis system can capture any errors that may be currently occurring. For example, the audio and video sentiment analysis system can capture a video of a user interface showing certain crashes to certain aspects of the game, such as a particular locational crash of a non-player character of a game. The audio and video sentiment analysis system can capture a video of the user. For example, the and video sentiment analysis system can record a video of the user via a webcam. The audio and video sentiment analysis system can capture the recordings of the user interface and of the user (as well as other user data such as an audio stream) while actions are taken by the user within the game development tool. As such, the audio and video sentiment analysis system can analyze the user data to make determinations of the concern, such as identifying sentiments, prioritizing help desk tickets, usability improvement comments, and general product feedback, and/or providing training video.

At block 308, the audio and video sentiment analysis system can capture an audio stream of a user. For example, the audio and video sentiment analysis system can send a command to a user computing device to record an audio stream from a user's webcam or microphone on a headset. The user computing system can transmit the recording to the audio and video sentiment analysis system for analysis.

At block 312, the audio and video sentiment analysis system can transcribe the audio stream. In some embodiments, the audio and video sentiment analysis system can transcribe audio from a video stream, such as a webcam recording including both visual data and audio data. The transcription can transcribe an audio file to text.

At block 314, the audio and video sentiment analysis system can identify characteristics of the user data. The user data can correspond to data related to the user, such as a video recording of the user, an audio recording of the user, a user interface recording of a user navigating through the game development tool, a user's input via a mouse or keyboard, and/or other types of data corresponding to the user.

In some embodiments, the audio and video sentiment analysis system can identify a characteristic such as a voice tone. In some embodiment, the audio and video sentiment analysis system can identify a characteristic based on a comparison with a baseline value. For example, the baseline can include a baseline voice tone. The audio and video sentiment analysis system can compare the voice tone of the recording and identify that there is an increase in voice tone. The audio and video sentiment analysis system can indicate that change in the voice tone meets a threshold. The inflexions in their voices can be an indication for the audio and video sentiment analysis system on how the user is feeling.

In some embodiments, the audio and video sentiment analysis system can apply the user data to a model and/or a pattern matching model. The audio and video sentiment analysis system can identify a voice tone that is increasing over time as an indication that the user is frustrated.

At block 316, the audio and video sentiment analysis system can sync a recording of the user interface with the audio stream. For example, the audio and video sentiment analysis system can sync the recording of the current user interface captured in block 310 with the audio stream captured in block 308. The audio and video sentiment analysis system can sync the recording of the user interface with the audio stream using a time stamp, such as a computer time stamp of the user computing system. In some embodiments, the audio and video sentiment analysis system can add an indicator of the time on the transcribed text.

At block 318, the audio and video sentiment analysis system can group the sync'd data file with other data files based on similar characteristics. For example, the audio and video sentiment analysis system can identify that the user is using the terrain generation tool of a game development environment and is having issues and crashes while generating mountainous terrain. The audio and video sentiment analysis system can group the sync'd data file with the recording of the user interface and transcribed text with other data files of other users that are facing similar crashes on the game terrain generation tool.

At block 320, the audio and video sentiment analysis system can transmit the group of data files to the corresponding support system for the terrain generation tool. The audio and video sentiment analysis system can indicate that this group of data files are related to crashes in the generation of mountainous terrain. Advantageously, the support system can replay user interfaces and other user data (such as video and audio of users) across a number of different users. The support system can get a better picture of the issues that may not be readily apparent from just a single user's video/audio stream. For example, a first user may have selected buttons 1, 2, and 3 to generate the crash, whereas a second user may have selected buttons 2 and 3. The support system can identify that the button 1 may not be relevant to the crash.

In some embodiments, the video and audio sentiment analysis system can transmit the sync'd data file of user data, such as a user interface recording and transcribed text, to a support system so that the support team can provide live help or debugging. The video and audio sentiment analysis system can display a chat room where a support team member can communicate directly with the user while watching the replay of the user's steps in the game development tool.

Example of Identification of Characteristics

Figure 4:
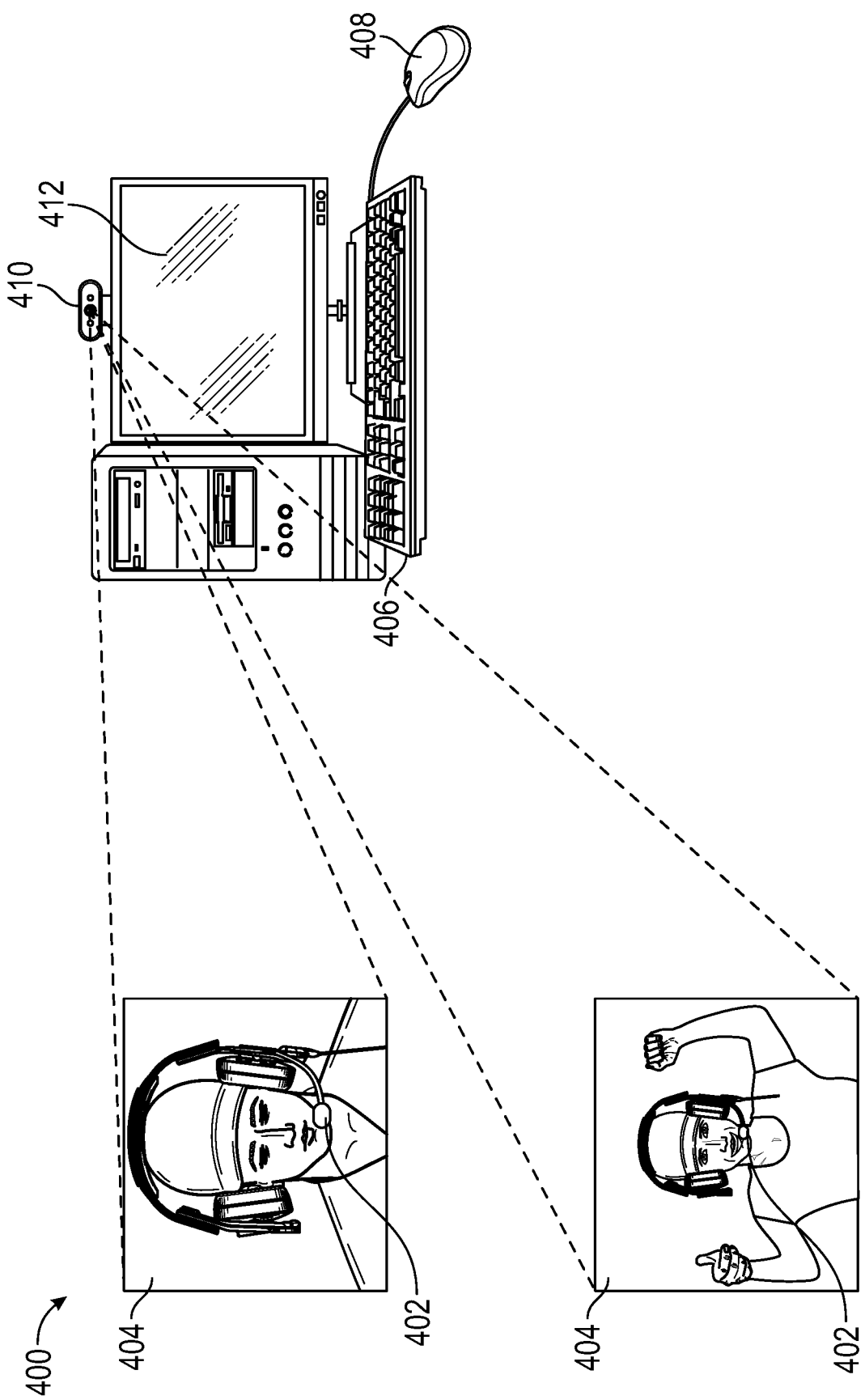
FIG. 4 illustrates an embodiment of the identification of characteristics.

FIG. 4 illustrates an embodiment 400 of the identification of characteristics. The audio and video sentiment analysis system can request data from a user computing system. For example, the audio and video sentiment analysis system can request user data, such as an audio stream from user's microphone 402, a video stream from a webcam 410, user input data such as a click stream from a user's keyboard 406 and a mouse stream from a mouse 408, and a recording of the user interface 412. Advantageously, the video and audio sentiment analysis system can identify certain hot keys that the users may be using, which may help indicate the source of concern, such as if the hot key performs several steps on the game development tool. Moreover, a recording of the user interface may not indicate the steps that are taken via the hot keys, because the functions may be performed without the mouse clicking on certain buttons.

In some embodiments, the audio and video sentiment analysis system can receive the user data and identify characteristics of the user data. For example, the audio and video sentiment analysis system can perform facial recognition of the user's face to determine the shape of certain facial features. The audio and video sentiment analysis system can determine that the user is frowning in an earlier portion 404A of the video stream, and is smiling in a later portion 404B of the video stream. The audio and video sentiment analysis system can identify that the head of a user in the earlier portion 404A is tilted, whereas the hands of the user in the later portion 404B are in the air with a thumbs up.

In some embodiments, the audio and video sentiment analysis system can identify a sentiment of a user based on the identified characteristics. For example, the audio and video sentiment analysis system can identify that the user is unhappy and is expressing a lot of concern in 404A based on an upset voice tone, frowning face, and tilted head, whereas the user is happy in the later portion 404B of the video based on excited words such as "Yes!", a thumbs up, and hands in the air.

In some embodiments, the audio and video sentiment analysis system can prioritize the help desk tickets, usability improvement comments, and general product feedback and/or portions of the video stream based on the identified characteristics and/or the identified sentiment. For example, the audio and video sentiment analysis system can expedite a help desk ticket, usability improvement comments, and general product feedback, and/or send a request for live help when the audio and video sentiment analysis system identifies a frustrated user, such as the user in the earlier portion 404A.

In some embodiments, the audio and video sentiment analysis system can indicate on the recording the portion of the video stream that corresponds to certain sentiments. For example, the entire video stream of the user can be sent to the user, but the earlier portion 404A where the user is unhappy can be highlighted, such that a support team member using the support system can know to focus on the earlier portion 404A.

Providing Live Help Flow Diagram

Figure 5:
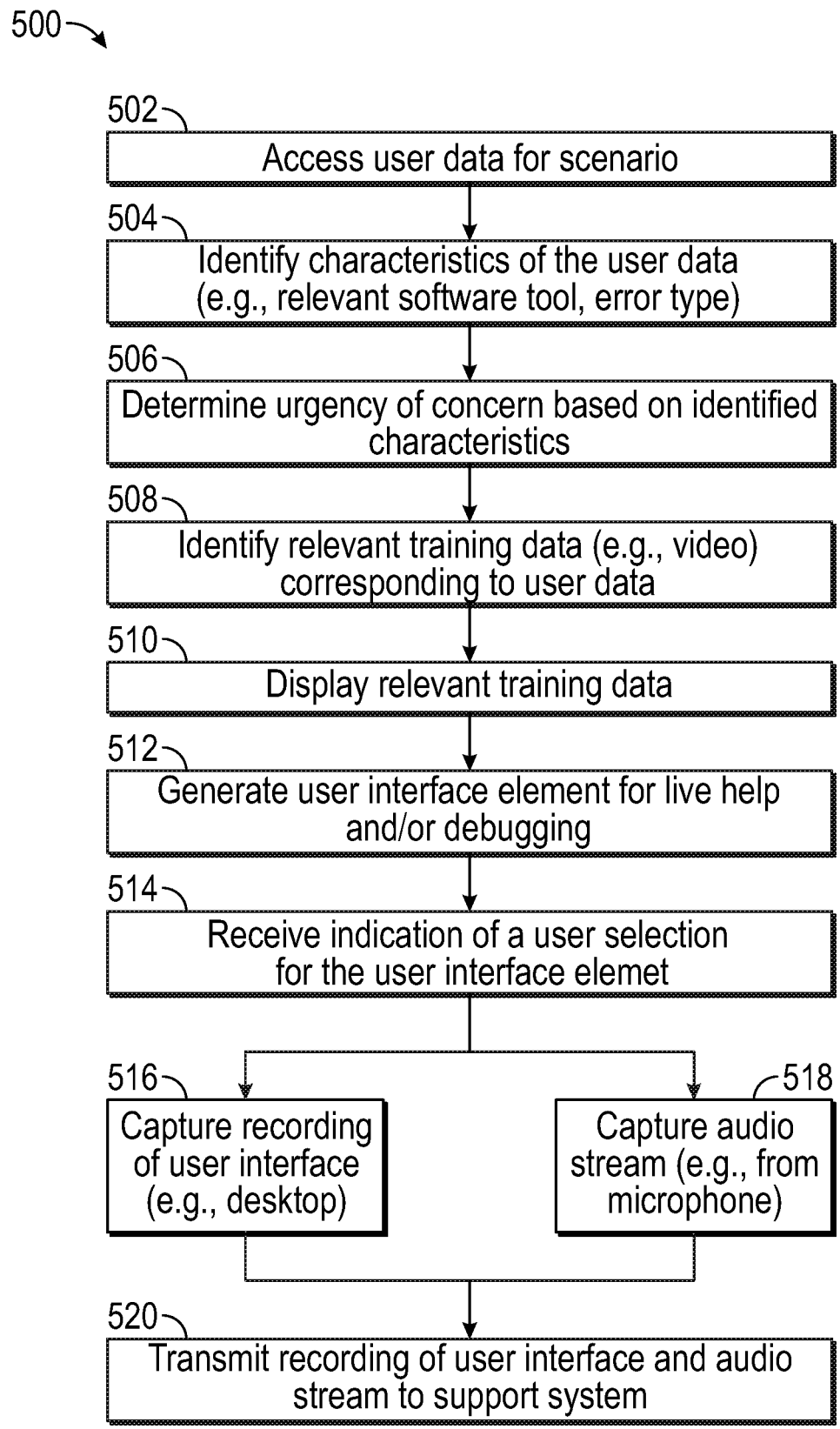
FIG. 5 illustrates an embodiment of a flow diagram for providing live help.

FIG. 5 illustrates an embodiment 500 of a flow diagram for providing live help. The process 500 can be implemented by any system that can provide help to the user. For example, the process 500, in whole or in part, can be implemented by the characteristics identification module 224, or other computing system. Although any number of systems, in whole or in part, can implement the process 500, to simply discussion, the process 500 will be described with respect to particular systems. Further, although embodiments of the process 500 may be performed with respect to variations of systems comprising various game development environments and/or game engines, to simply discussion, the process 500, will be described with respect to the audio and video sentiment analysis system 100.

At block 502, the audio and video sentiment analysis system access user data for a scenario. For example, the audio and video sentiment analysis system can be continuously recording a user interface during a time period where the user is developing a game via a game development tool. The audio and video sentiment analysis system can request a recording of the user's interface, a video of the user, an audio stream of the user, user input, and/or the like.

At block 504, the audio and video sentiment analysis system can identify characteristics of the user data. For example, the audio and video sentiment analysis system can identify the software tool and version of the game development tool the user is working on. The audio and video sentiment analysis system can identify characteristics of the user, such as a user voice tone or facial features based on facial recognition.

At block 506, the audio and video sentiment analysis system can determine an urgency of concern based on the identified characteristics and/or identified sentiments. For example, the audio and video sentiment analysis system can determine that the user experienced repeated crashes, based on an analysis of the user interface recording. The audio and video sentiment analysis system can determine a change in a user's voice. The audio and video sentiment analysis system can determine that the user is upset based on an increase in a user's voice volume or certain words the user says in the audio stream. The audio and video sentiment analysis system can identify that the user's eye brows are raised more than a baseline level. The audio and video sentiment analysis system can determine that the user is very angry based on eye brows raised and an unhappy mouth. The audio and video sentiment analysis system can set an urgency based on these characteristics. For example, the audio and video sentiment analysis system can determine a high level of urgency if volume of the user's voice of the user is 10 decibels higher than the baseline volume.

At block 508, the audio and video sentiment analysis system can identify relevant training material for the scenario of the user. The audio and video sentiment analysis system can identify that the user is using a particular feature of a development tool. The audio and video sentiment analysis system can identify training video or text corresponding to the particular feature of the development tool. The audio and video sentiment analysis system can identify that the user is experiencing crashing when the user is selecting the pen feature of the development tool. The audio and video sentiment analysis system can identify relevant training videos pertaining to the pen tool. The audio and video sentiment analysis system can preemptively identify the training material and display the training material even before the user requests help. Advantageously, the audio and video sentiment analysis system can provide trouble shooting predictively and preemptively. At block 510, the audio and video sentiment analysis system can display the relevant training data to the user.

At block 510, the audio and video sentiment analysis system can display and/or cause display of a user interface element for live help and/or debugging. For example, the audio and video sentiment analysis system can display a radio button that says "Do you need live help?" At block 512, the audio and video sentiment analysis system can receive an indication of a user selection for the user interface element.

At block 516, the audio and video sentiment analysis system can capture a recording of the user interface, and at block 518 the audio and video sentiment analysis system can capture an audio stream. At block 520, the recordings of the user interface and audio stream can be transmitted to the support system for the support system to see the user interface of the user while the user explains the concern via the audio stream. The audio and video sentiment analysis system can begin capturing the user interface recording and/or audio stream at other portions of the flow diagram, such as in response to determining an urgency of concern. For example, if the audio and video sentiment analysis system identifies a higher urgency of concern, the audio and video sentiment analysis system can begin recording automatically even before the user selects the user interface element. In some embodiments, the video and/or audio stream of the user can indicate to the support system the effectiveness of the help provided by a support team member.

Sentiment Analysis Flow Diagram

Figure 6:
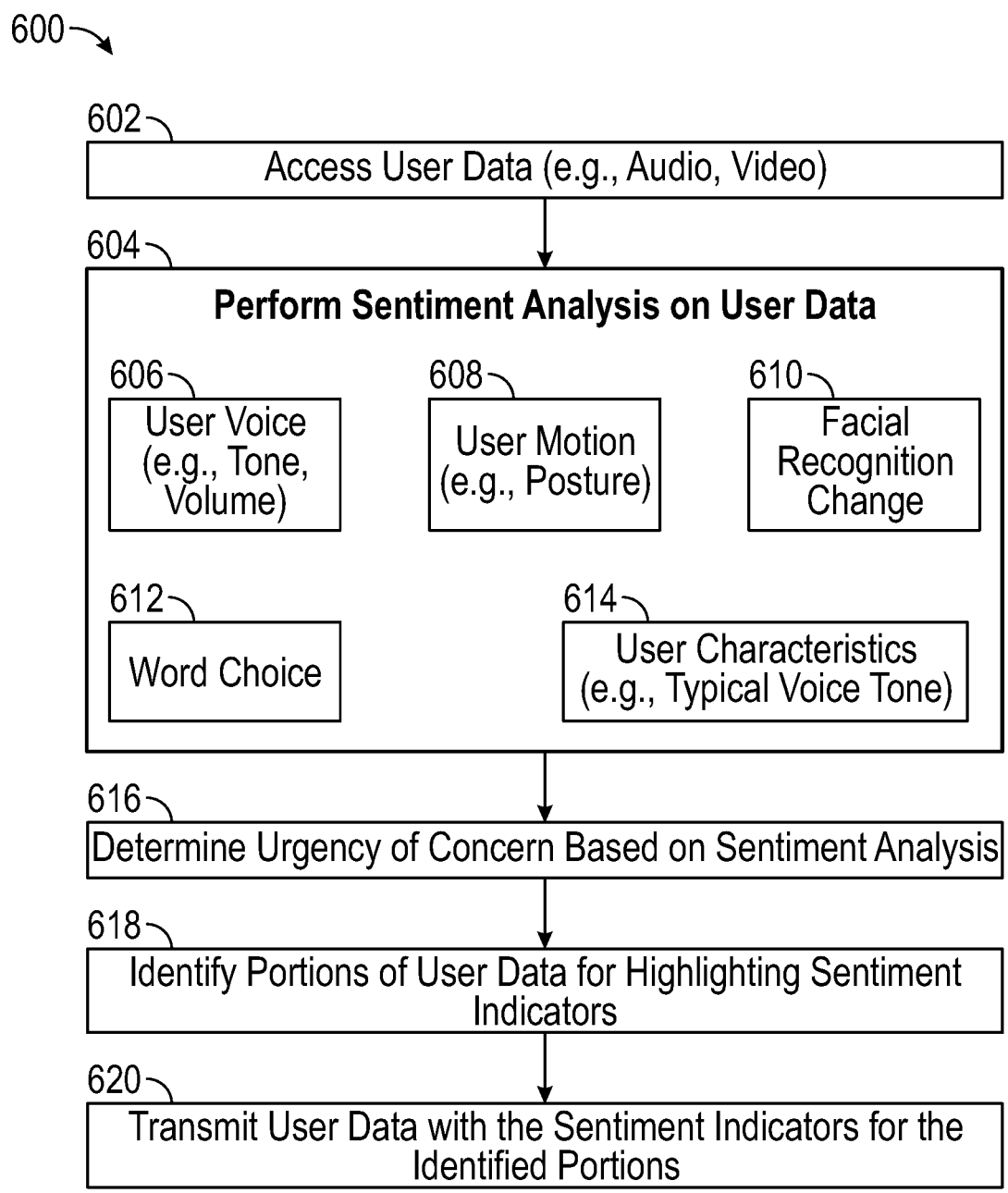
FIG. 6 illustrates an embodiment of a flow diagram of sentiment analysis.

FIG. 6 illustrates an embodiment 600 of sentiment analysis. The process 600 can be implemented by any system that can identify a sentiment of a user. For example, the process 600, in whole or in part, can be implemented by the sentiment analysis module 220, or other computing system. Although any number of systems, in whole or in part, can implement the process 600, to simply discussion, the process 600 will be described with respect to particular systems. Further, although embodiments of the process 600 may be performed with respect to variations of systems comprising various game development environments and/or game engines, to simply discussion, the process 600, will be described with respect to the audio and video sentiment analysis system 100.

At block 602, the audio and video sentiment analysis system access user data, such as a video and/or audio recording of a user, recordings of a user interface, or user telemetry data.

At block 604, the audio and video sentiment analysis system can perform sentiment analysis on the user data. In some embodiments, the audio and video sentiment analysis system can identify characteristics of the user data, and the audio and video sentiment analysis system can perform sentiment analysis on the characteristics of the user data.

In some embodiments, the audio and video sentiment analysis system can perform sentiment analysis on a user voice 606. For example, the audio and video sentiment analysis system can identify a change in tone or volume of the user voice 606. The audio and video sentiment analysis system can identify a characteristic in the user motion 608. For example, the audio and video sentiment analysis system can identify that the user has his hands on his face or forehead for extended periods of time, and the audio and video sentiment analysis system can determine that the user is upset. The audio and video sentiment analysis system can perform facial recognition and identify a sentiment on a facial recognition change 610. For example, the audio and video sentiment analysis system can identify dimples on the user at certain times, a smile, open eyes, eye tracking going from one feature to the next, and/or the like that indicates a happy game developer and/or game player. The audio and video sentiment analysis system can transcribe an audio stream and identify word choice 612 of a user to indicate sentiments, such as "success" for a satisfied user, and profanity for an upset user. The audio and video sentiment analysis system can identify characteristics of the user 614, such as a typical voice tone, posture, face characteristics for a neutral face. The typical characteristics can serve as a baseline when correlating the sentiment. The audio and video sentiment analysis system can bookmark certain time frames and/or portions of the audio stream of the user, video stream of the user, user interface video, and/or other user data corresponding to the identified sentiment.

At block 616, the audio and video sentiment analysis system can determine an urgency of concern based on the sentiment analysis. For example, the audio and video sentiment analysis system can determine that the user experienced repeated crashes, based on an analysis of the user interface recording and that the user is using a lot of profanity and is standing up and leaving the desk area at the point of crashing. The audio and video sentiment analysis system can determine that the user is very upset, more than the typical reaction of the user from other crashes. The audio and video sentiment analysis system can set a very high urgency level based on this analysis and may route the help desk ticket, usability improvement comments, and general product feedback to a member currently available to help. In some embodiments, the audio and video sentiment analysis system can output a probability for a sentiment, based on an output of a neural network that is trained to identify one or more sentiments based on user data.

At block 618, the audio and video sentiment analysis system can identify portions of the user data for highlighting sentiment indicators. The recording may be over 20 minutes where the user is explaining the background (e.g., what software tool, what team the game developer is on) in the first 10 minutes, and begins explaining the steps taken and his frustration in the last 10 minutes. The audio and video sentiment analysis system can identify the last 10 minutes as the portions for the support team to focus on based on an analysis of the transcribed text that indicates the first 10 minutes is only related to background information. The audio and video sentiment analysis system can identify certain portions of the last 10 minutes as sections of high urgency of concern, where the user may be yelling or standing. At block 620, the audio and video sentiment analysis system can transmit the user data with the sentiment indicators for the identified portions to the support system. For example, a support team member can replay the recordings, and the audio stream where the user was screaming can be highlighted in red.

Predictive Analysis Flow Diagram

Figure 7:
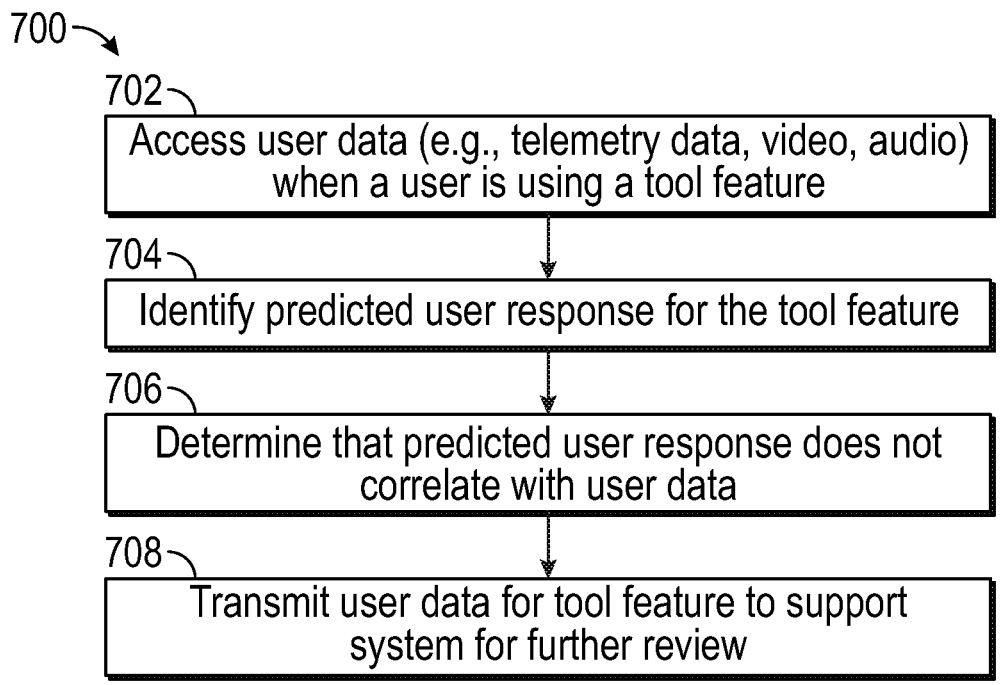
FIG. 7 illustrates an embodiment of a flow diagram for predictive analysis.

FIG. 7 illustrates an embodiment 700 of a flow diagram for predictive analysis. The process 700 can be implemented by any system that can predict a user response. For example, the process 700, in whole or in part, can be implemented by the characteristic identification module 224, or other computing system. Although any number of systems, in whole or in part, can implement the process 700, to simply discussion, the process 600 will be described with respect to particular systems. Further, although embodiments of the process 700 may be performed with respect to variations of systems comprising various game development environments and/or game engines, to simply discussion, the process 700, will be described with respect to the audio and video sentiment analysis system 100.

At block 702, the audio and video sentiment analysis system access user data, such as a video and/or audio recording of a user, recordings of a user interface, or user telemetry data. For example, the audio and video sentiment analysis system can identify a user's actions, responses, and/or the like to a particular tool feature of a development tool. At block 704, the audio and video sentiment analysis system can predict a user response to a tool feature. For example, the audio and video sentiment analysis system can identify that a user typically selects a second button after selecting the first button. The audio and video sentiment analysis system can identify that users typically look at the top right screen when a certain action is displayed and/or a certain tool feature is used.

At block 706, the audio and video sentiment analysis system can determine that the user response for the tool feature does not correlate with the predicted user response. For example, the audio and video sentiment analysis system can identify that the user's eyes are looking at a different part of the screen and/or a mouse cursor is on a different portion of the user interface than predicted. The audio and video sentiment analysis system can flag this as an indication that the user may need help on the tool. The audio and video sentiment analysis system can identify training data, such as via block 508 in FIG. 5, or perform sentiment analysis 604 in FIG. 6, in response to the predicted response not matching with the actual user response. The audio and video sentiment analysis system can cause display of a user interface element, such as via block 304 of FIG. 3. The audio and video sentiment analysis system can further analyze the user data to determine whether the user is in need of help. At block 708, the audio and video sentiment analysis system can transmit the user data to the support system for further review.

Sentiment Analysis for Development Tool Features Flow Diagram

Figure 8A:
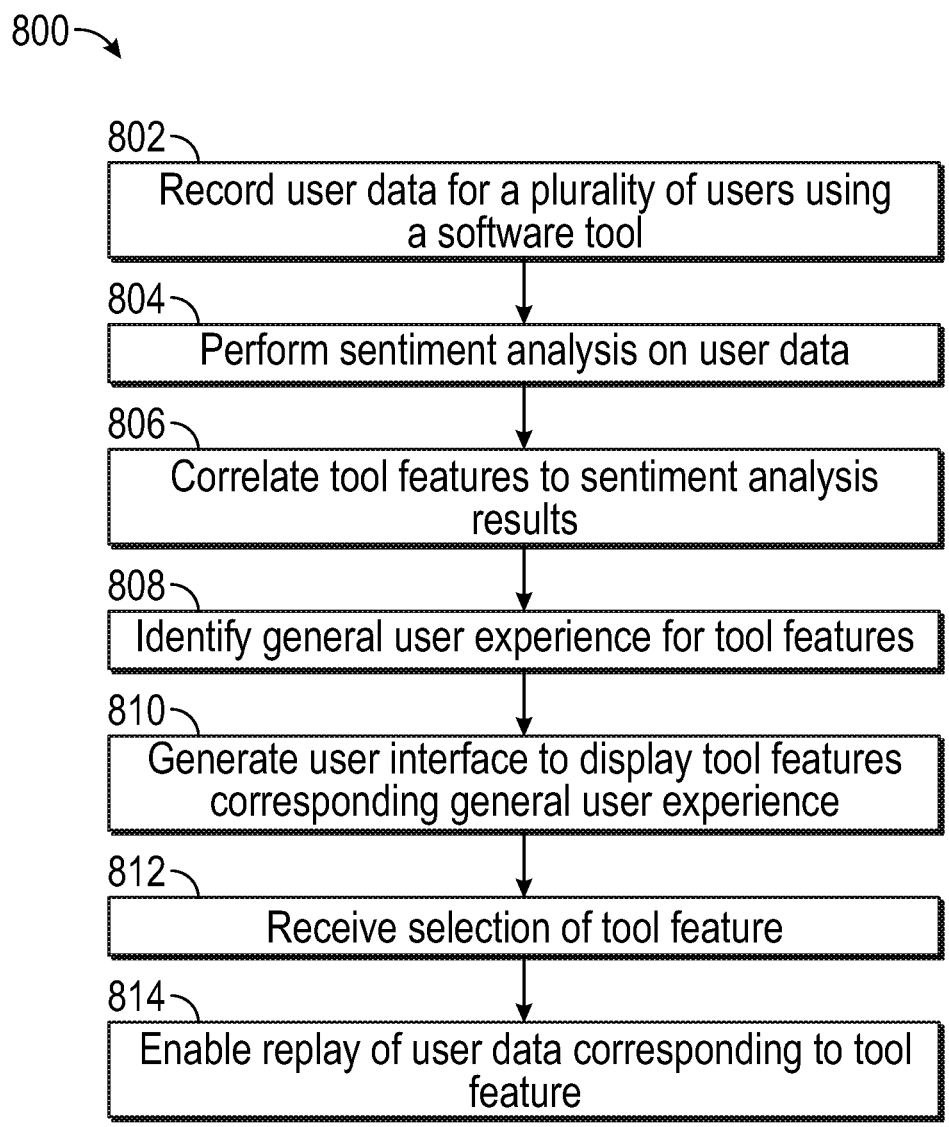
FIG. 8A illustrates an embodiment of a flow diagram for sentiment analysis for development tool features.

FIG. 8A illustrates an embodiment 800 of a flow diagram for sentiment analysis for development tool features. The process 800 can be implemented by any system that can predict a user response. For example, the process 800, in whole or in part, can be implemented by the sentiment analysis module 220, or other computing system. Although any number of systems, in whole or in part, can implement the process 800, to simply discussion, the process 600 will be described with respect to particular systems. Further, although embodiments of the process 800 may be performed with respect to variations of systems comprising various game development environments and/or game engines, to simply discussion, the process 800, will be described with respect to the audio and video sentiment analysis system 100.

At block 802, the audio and video sentiment analysis system can record user data for a plurality of users using a particular software tool, such as a video and/or audio recording of a user, recordings of a user interface, or user telemetry data. At block 804, the audio and video sentiment analysis system can perform sentiment analysis on the user data, such as via block 604 of FIG. 6.

At block 806, the audio and video sentiment analysis system can correlate tool features to sentiment analysis results. For example, the audio and video sentiment analysis system can identify that the first and second users were using tool feature A and third and fourth users were using tool feature B. The audio and video sentiment analysis system can group the first and second users, and group the third and fourth users.

At block 808, the audio and video sentiment analysis system can identify a general user experience for tool features. The audio and video sentiment analysis system can determine that 80% of the users that were using tool feature A were satisfied, whereas only 50% of the users that were using tool feature B were satisfied.

At block 810, the audio and video sentiment analysis system can generate a user interface to display tool features and corresponding general user experiences. For example, the audio and video sentiment analysis system can display tool feature A next to an 80%, and tool feature B next to a 50%.

At block 812, the audio and video sentiment analysis system can receive a selection of a tool feature, such as tool feature A. At block 814, the audio and video sentiment analysis system can enable replay of the user data corresponding to the tool feature. Advantageously, the support system can replay video and audio for tool feature B to get an understanding on why the users using tool feature B are upset.

Sentiment Analysis for Development Tool Features Example

Figure 8B:
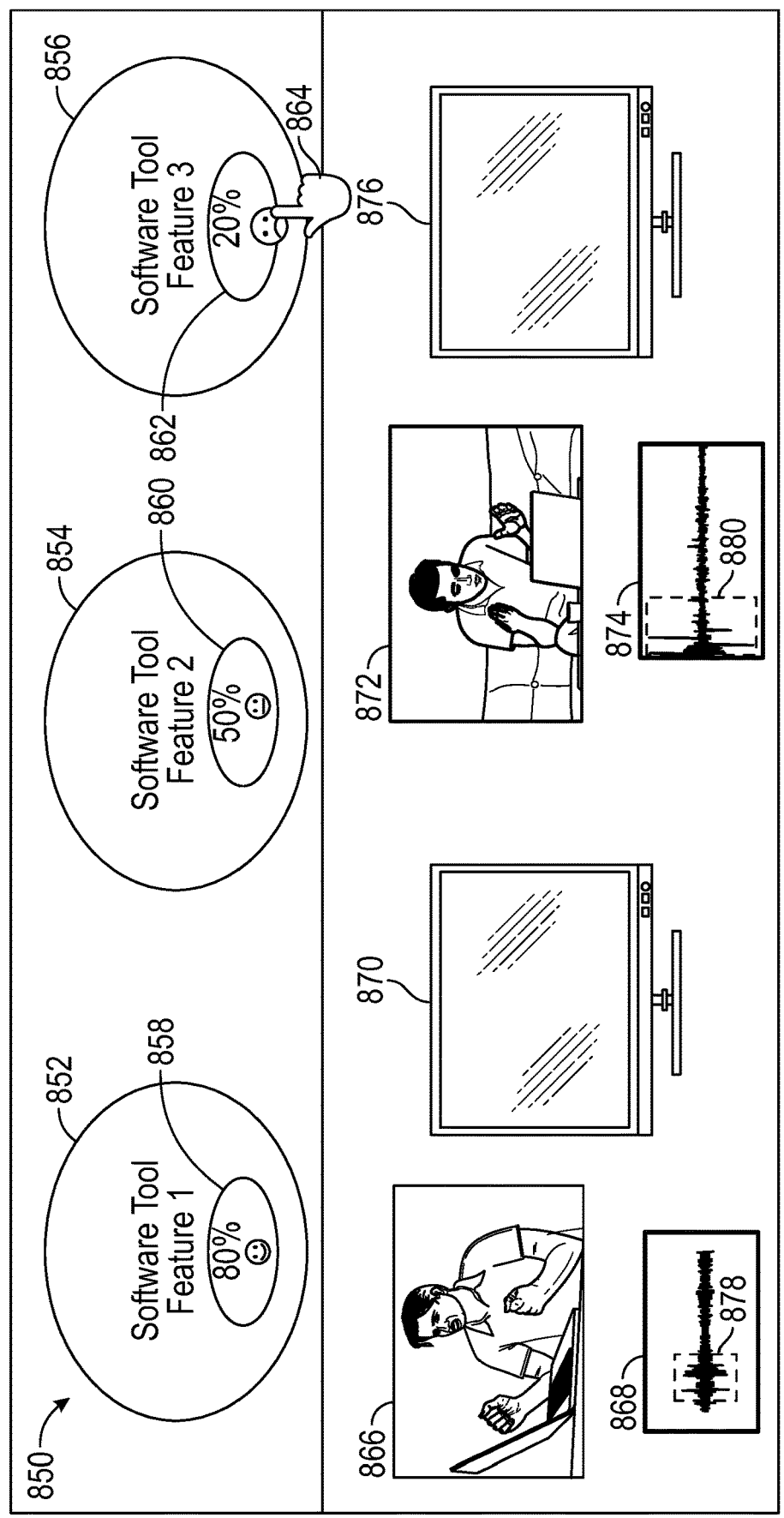
FIG. 8B illustrates an embodiment of for sentiment analysis for development tool features.

FIG. 8B illustrates an embodiment 850 of for sentiment analysis for development tool features. The audio and video sentiment analysis system can display software tool features, such as tool feature 1 852, software tool feature 2 854, and software tool feature 3 856. The audio and video sentiment analysis system can indicate a general satisfaction for each feature 858, 860, 862. For example, the audio and video sentiment analysis system can perform sentiment analysis on user data for users working on software tool feature 1, and identify a percentage of users that were happy and/or upset, to generate a probability for display.

In some embodiments, the audio and video sentiment analysis system can receive a selection of a software tool 864. The audio and video sentiment analysis system can replay user data for the software team to identify the steps taken and the environment of concern generating unhappy users. For example, the audio and video sentiment analysis system can display a video of a first user 866 and a second user 872. The audio and video sentiment analysis system can display the user interface for the first user 866 and a second user 876. The audio and video sentiment analysis system can play the audio stream for the first and second users 868, 874. The audio and video sentiment analysis system can highlight portions of the recordings, such as on the audio streams 868 and 874, that highlight portions that the support team can focus on. For example, the audio and video sentiment analysis system can highlight the portions of the audio stream 878 and 880 where the user is screaming, which can indicate the portion of the recordings where the user is determined to be upset.

Overview of Computing Device

Figure 9:
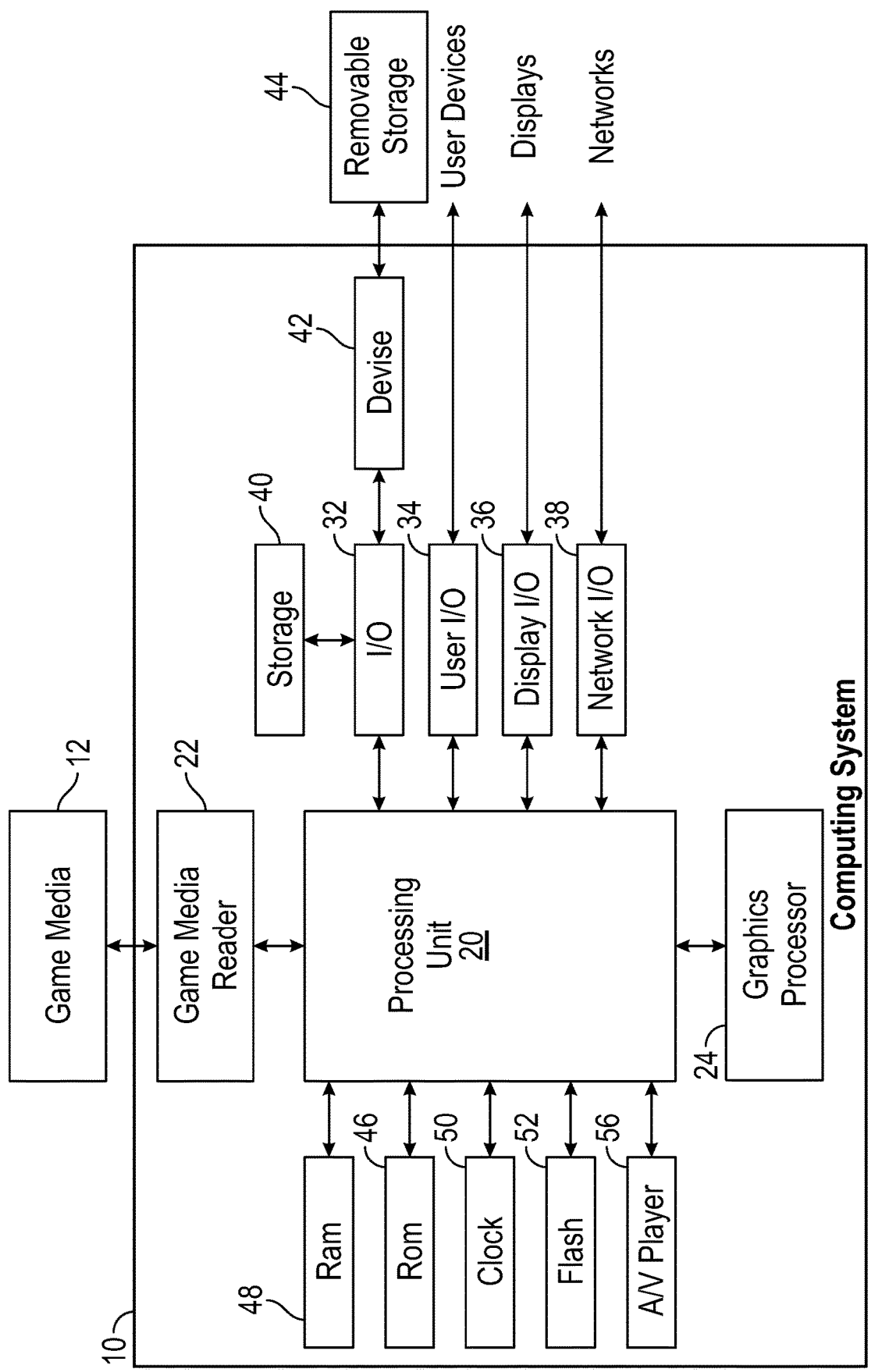
FIG. 9 illustrates an embodiment of computing device that may implement aspects of the present disclosure.

FIG. 9 illustrates an embodiment of a computing device 10 that may implement aspects of the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10. The computing device 10 can include one or more components for the interactive computing system 160, a user computing system 152, and/or the support system 182, such as a audio and video sentiment analysis system 218, a sentiment analysis module 220, a transcribe module 222, an characteristics identification module 224, a database of sentiment data 226, a database of user data 228, and/or a database of tutorials 230. In some embodiments, the interactive computing system 160, a user computing system 152, and/or a support system 182 can include one or more components of the computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system for video and audio analysis for a support ticket, a usability improvement comment, or a product feedback, wherein the system includes:
   one or more processors configured with computer executable instructions that configure the one or more processors to:
   access user data for a scenario, wherein the user data comprises:
      a first video recording of a user interface; and
      an audio stream of a user;
   identify a first and second baseline characteristic for the user;
   analyze actions performed by the user within the user interface in one or more time frames of the first video and a voice of the user in the audio stream to identify a first characteristic for the first video and a second characteristic for the audio stream, respectively;
   perform sentiment analysis on the user data to identify one or more sentiments based on a comparison of the first baseline characteristic with the first characteristic, and the second baseline characteristic with the second characteristic;
   generate a visual indicator indicating a time frame in the user data at the one or more time frames corresponding to the identified one or more sentiments, and
   route the user data with the visual indicator to a support queue based on the identified first or second characteristic.

2. The system of claim 1, wherein the one or more processors are further configured to:
   identify training material corresponding to the identified first or second characteristic; and
   cause display of the training material with a user interface element for submitting a support ticket.

3. The system of claim 1, wherein the one or more processors are further configured to:
   continuously record the first video of the user interface over a time period in a ring buffer; and
   in response to receiving an indication of the user selection of a help button, store the first video of the user interface.

4. The system of claim 1, wherein the one or more processors are further configured to:
   snyc the first video with the audio stream based on a computer time stamp.

5. The system of claim 1, wherein the user data further comprises at least one of: user telemetry data, an event time line, user input from a keyboard, or user input from a mouse.

6. The system of claim 1, wherein the user data further comprises a second video of the user via a camera or camcorder.

7. The system of claim 6, wherein to perform sentiment analysis includes performing facial recognition on the second video of the user.

8. The system of claim 1, wherein the second characteristic includes at least one of: a voice tone or voice volume.

9. The system of claim 1, wherein the one or more processors are further configured to transcribe the audio stream into text, and wherein the second characteristic includes a word choice.

10. A method for video and audio analysis for a support ticket, a usability improvement comment, and a product feedback, wherein the method includes:
    accessing user data for a scenario, wherein the user data comprises:
       a video recording of a user interface; and
       an audio stream of a user;
    identifying a first and second baseline characteristic for the user;

analyzing actions performed by the user within the user interface in one or more time frames of the video and a voice of the user in the audio stream to identify a first characteristic for the video and a second characteristic for the audio stream, respectively;

performing sentiment analysis on the user data to identify one or more sentiments based on a comparison of the first baseline characteristic with the first characteristic, and the second baseline characteristic with the second characteristic;

generating a visual indicator indicating a time frame in the user data at the one or more time frames corresponding to the identified one or more sentiments, and routing the user data with the visual indicator to a support queue based on the identified first or second characteristic.

11. The method of claim 10, wherein the method further includes:

linking the user data with user data of other users based on matching first and/or second characteristics.

12. The method of claim 11, wherein the method further includes:

identifying a general user experience for a software tool corresponding to the user data of the user and the user data of the other users.

13. The method of claim 12, wherein identifying the general user experience is based on the sentiment analysis performed on the user data and a sentiment analysis performed on the user data of the other users.

14. The method of claim 10, wherein the method further includes:

identifying a software tool that the user is using during the video recording, wherein the first or second baseline characteristic is a predicted user response for the identified software tool.

15. The method of claim 10, wherein the method further includes:

determine an indication of urgency based on the sentiment analysis.

16. The method of claim 10, wherein the method further includes:

transmitting the user data and the visual indicator to a support system, wherein the support system is configured to replay the user data and display indications of the book marks on the user data.

17. A non-transitory computer storage medium storing computer-executable instructions that, when executed by one or more processor, cause the one or more processors to perform the following method:

accessing user data for a scenario, wherein the user data comprises:
a video recording of a user interface; and
an audio stream of a user;

identifying a first and second baseline characteristic for the user;

analyzing actions performed by the user within the user interface in one or more time frames of the video and a voice of the user in the audio stream to identify a first characteristic for the video and a second characteristic for the audio stream, respectively;

performing sentiment analysis on the user data to identify one or more sentiments based on a comparison of the first baseline characteristic with the first characteristic, and the second baseline characteristic with the second characteristic;

generating a visual indicator indicating a time frame in the user data at the one or more time frames corresponding to the identified one or more sentiments, and routing the user data with the visual indicator to a support queue based on the identified first or second characteristic.

18. The non-transitory computer storage medium of claim 17, wherein the method further comprises:

identifying training material corresponding to the identified first or second characteristic; and causing display of the training material with a user interface element for submitting a support ticket.

19. The non-transitory computer storage medium of claim 17, wherein the method further comprises:

continuously recording the video of the user interface over a time period in a ring buffer; and in response to receiving an indication of the user selection of a help button, storing the video of the user interface.

20. The non-transitory computer storage medium of claim 17, wherein the method further comprises:

syncing the video with the audio stream based on a computer time stamp.

* * * * *

UNITED STATES PATENT AND TRADEMARK OFFICE
CERTIFICATE OF CORRECTION

| | | |
|---|---|---|
| PATENT NO. | : 10,860,345 B2 | Page 1 of 1 |
| APPLICATION NO. | : 16/367107 | |
| DATED | : December 8, 2020 | |
| INVENTOR(S) | : Grace Yen et al. | |

It is certified that error appears in the above-identified patent and that said Letters Patent is hereby corrected as shown below:

In the Drawings

In sheet 5 of 10, FIG. 5, reference numeral 514, Line 2, delete "elemet" and insert -- element --.

In sheet 10 of 10, FIG. 9, reference numeral 42, Line 1, delete "Devise" and insert -- Device --.

In the Specification

In Column 13, Line 44, delete "204 The" and insert -- The --.

In the Claims

In Column 26, Line 43, Claim 4, delete "snyc" and insert -- sync --.

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*